(No Model.)

T. A. NAYLOR.
TUMBLING REEL FOR CLEANING CARPETS.

No. 258,796. Patented May 30, 1882.

Witnesses:
Harry Drury
David S. Williams

Inventor:
Thomas A. Naylor
by his Attorneys
Howson and Jones

UNITED STATES PATENT OFFICE.

THOMAS A. NAYLOR, OF WILMINGTON, DELAWARE.

TUMBLING-REEL FOR CLEANING CARPETS.

SPECIFICATION forming part of Letters Patent No. 258,796, dated May 30, 1882.

Application filed July 25, 1881. (No model.)

*To all whom it may concern:*

Be it known that I, THOMAS A. NAYLOR, a citizen of the United States, residing in Wilmington, New Castle county, Delaware, have invented certain Improvements in Tumbling-Reels for Cleaning Carpets, &c., of which the following is a specification.

My invention relates to an improvement in what are known as "tumbling-reels," which are used for cleaning various substances and materials by abrasion and impact as the partly-filled reel is rotated, my improvements relating more particularly to tumbling-reels of large size, such as are supported directly upon the driving-wheels, the object of my invention being to so construct such a tumbling-reel as to particularly adapt it for the cleaning of carpets.

Figure 1:
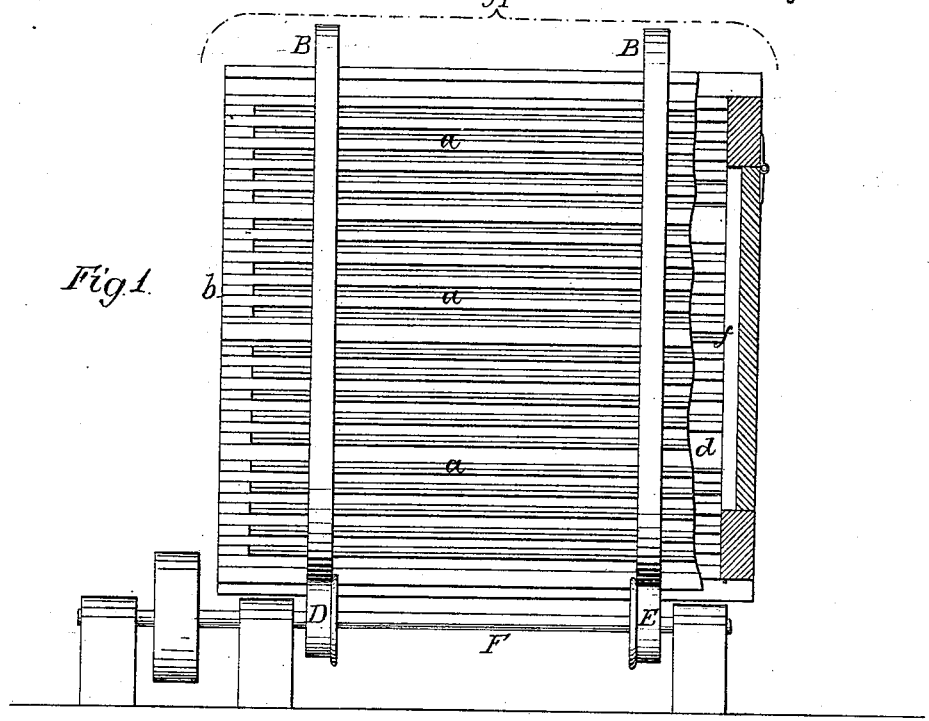
Figure 2:
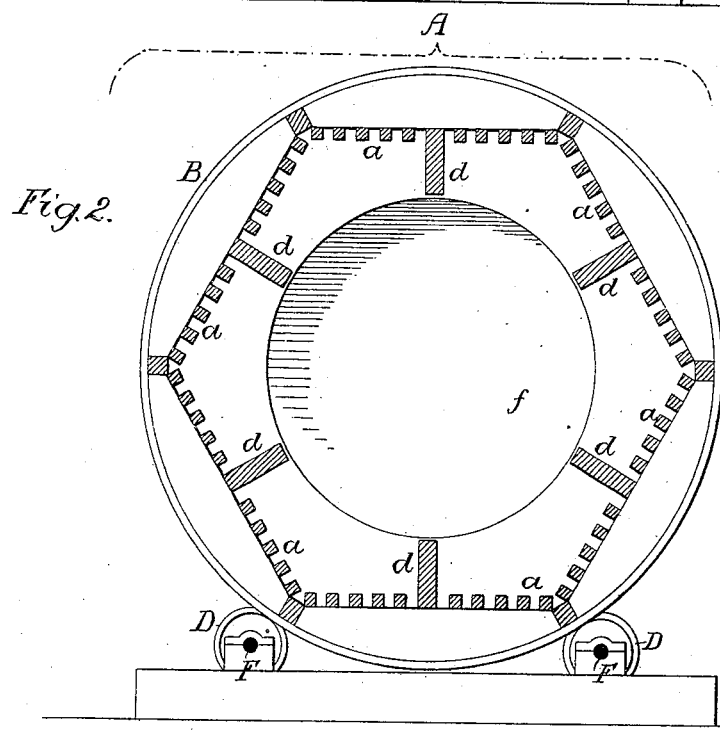

In the accompanying drawings, Figure 1 is a front view of my improved tumbling-reel, and Fig. 2 a transverse section.

The reel A is a structure of hexagonal or other appropriate shape, the shell of which consists of longitudinal slats $a$, suitably spaced and carried by the opposite heads $b$ $b$, the reel being furnished with internally-projecting radial ribs $d$, which serve to aid in the elevation and tumbling of the contents of the reel as the latter is rotated. On the outside of the reel, at suitable distances from the ends of the same, are two annular rails, B B, which rest upon and are supported by two pairs of wheels, D D and E E, carried by shafts F, arranged equidistant from the central longitudinal line of the reel, and adapted to bearings on a suitable foundation. Power is applied to either or both of the shafts F, and the reel is caused to rotate by the frictional contact of the rails B and the treads of the wheels D or E, or both, the power being thus exerted with good effect, and the disadvantage of axial journals and bearings being overcome, so that both heads of the reel are entirely unobstructed. I form an opening, $f$, for the introduction and removal of material in one or both of the heads $b$ of the reel, for by this means ready access to the interior of the reel at all times is permitted, and the cover with which each opening is provided is relieved from the impact of the falling mass in the reel, so that the opening can, without risk of accident, be made of larger area than an opening in the periphery of the reel.

In carrying out my invention more than two shafts F may be used, and each shaft may have three, four, or more wheels adapted to a like number of rails on the reel. Two shafts and two rails, as shown in the drawings, however, are sufficient for a machine of average size.

I am aware that tumbling-reels have been heretofore supported directly upon the driving-wheels, and this, therefore, I do not claim broadly; but

I claim as my invention—

The combination of the polygonal reel having slotted sides, annular rails B, and a covered opening in one or both ends, with flanged wheels D E, adapted to support said reel in a horizontal position and to drive the same by contact with the annular rails B, as set forth.

In testimony whereof I have signed my name to this specification in the presence of two subscribing witnesses.

T. A. NAYLOR.

Witnesses:
HARRY DRURY,
HARRY SMITH.